(12) United States Patent
Munk-Hansen

(10) Patent No.: US 11,192,759 B2
(45) Date of Patent: Dec. 7, 2021

(54) METHOD AND APPARATUS FOR RAISING OR LOWERING A LOAD PARALLEL TO A WIND TURBINE TOWER

(71) Applicant: Siemens Gamesa Renewable Energy A/S, Brande (DK)

(72) Inventor: Thorkil Munk-Hansen, Fredericia (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/484,527

(22) PCT Filed: Nov. 10, 2017

(86) PCT No.: PCT/EP2017/078826
§ 371 (c)(1),
(2) Date: Aug. 8, 2019

(87) PCT Pub. No.: WO2018/145784
PCT Pub. Date: Aug. 16, 2018

(65) Prior Publication Data
US 2020/0002136 A1    Jan. 2, 2020

(30) Foreign Application Priority Data
Feb. 9, 2017  (DE) ............ 10 2017 202 064.4

(51) Int. Cl.
*B66C 1/10* (2006.01)
*F03D 80/50* (2016.01)

(52) U.S. Cl.
CPC ............ *B66C 1/10* (2013.01); *F03D 80/50* (2016.05); *F05B 2230/61* (2013.01); *Y02E 10/728* (2013.01)

(58) Field of Classification Search
CPC ......... B66C 1/10; F03D 80/50; F05B 2230/61
(Continued)

(56) References Cited

U.S. PATENT DOCUMENTS 3,805,054 A * 4/1974 Wolf ................ F21V 21/38
362/403
4,092,707 A * 5/1978 Millerbernd ........ F21V 21/38
362/391
(Continued)

FOREIGN PATENT DOCUMENTS

CN    101024943 A    8/2007
CN    102398860 A    4/2012
(Continued)

OTHER PUBLICATIONS

International Search Report for application No. PCT/EP2017/078826 dated Feb. 8, 2018.
(Continued)

*Primary Examiner* — Ronald P Jarrett
(74) *Attorney, Agent, or Firm* — Schmeiser, Olsen & Watts LLP

(57) ABSTRACT

Provided is a method for raising or lowering a load parallel to a wind turbine tower, including raising or lowering the load using a cable, and exerting a force acting on the load towards the tower using guiding means supported at the tower. In the present method, a raising or lowering operation is assisted and the undesired movements of the load during raising or lowering are reduced.

9 Claims, 5 Drawing Sheets

(58) Field of Classification Search
USPC ..................................................... 52/741.14
See application file for complete search history.

(56) References Cited

U.S. PATENT DOCUMENTS

| | | | | |
|---|---|---|---|---|
| 4,348,717 | A * | 9/1982 | Thompson | F21V 21/38 |
| | | | | 362/391 |
| 6,074,075 | A * | 6/2000 | Staniec | F21V 21/38 |
| | | | | 362/249.11 |
| 2007/0006794 | A1* | 1/2007 | Swenson | E04H 12/32 |
| | | | | 116/173 |
| 2016/0237985 | A1* | 8/2016 | Bogl | F03D 13/10 |
| 2016/0369778 | A1* | 12/2016 | Davis | B66C 23/207 |
| 2018/0282135 | A1 | 10/2018 | Konijn | |

FOREIGN PATENT DOCUMENTS

| | | |
|---|---|---|
| CN | 102425530 A | 4/2012 |
| CN | 102787988 A | 11/2012 |
| CN | 103359637 A | 10/2013 |
| CN | 203359855 U | 12/2013 |
| CN | 103603772 A | 2/2014 |
| CN | 103644084 A | 3/2014 |
| CN | 103754772 A | 4/2014 |
| CN | 203529849 U | 4/2014 |
| CN | 203579656 U | 5/2014 |
| CN | 203715100 U | 7/2014 |
| CN | 104847597 A | 8/2015 |
| CN | 204661198 U | 9/2015 |
| CN | 204752010 U | 11/2015 |
| CN | 105736249 A | 7/2016 |
| DE | 102014016607 A1 | 5/2016 |
| EP | 2520792 A1 | 11/2012 |
| EP | 2520533 B1 | 11/2014 |
| JP | 2007192070 A | 8/2007 |
| JP | 2014208989 A | 11/2014 |
| WO | 2009101697 A1 | 8/2009 |
| WO | 2010136026 A2 | 12/2010 |
| WO | 2015078480 A1 | 6/2015 |
| WO | 2015140357 A1 | 9/2015 |

OTHER PUBLICATIONS

Office Action in corresponding Chinese Patent Application No. 201780086187.3, dated Apr. 9, 2020. 8 pages.

Cao, Yin; "Wind Power Technology and Application," Aug. 31, 2013; CN; pp. 174-180; 2013. 17 pages.

Notification to Grant in related Chinese Patent Application No. 201780086187.3 dated Sep. 17, 2021. 7 pages.

* cited by examiner

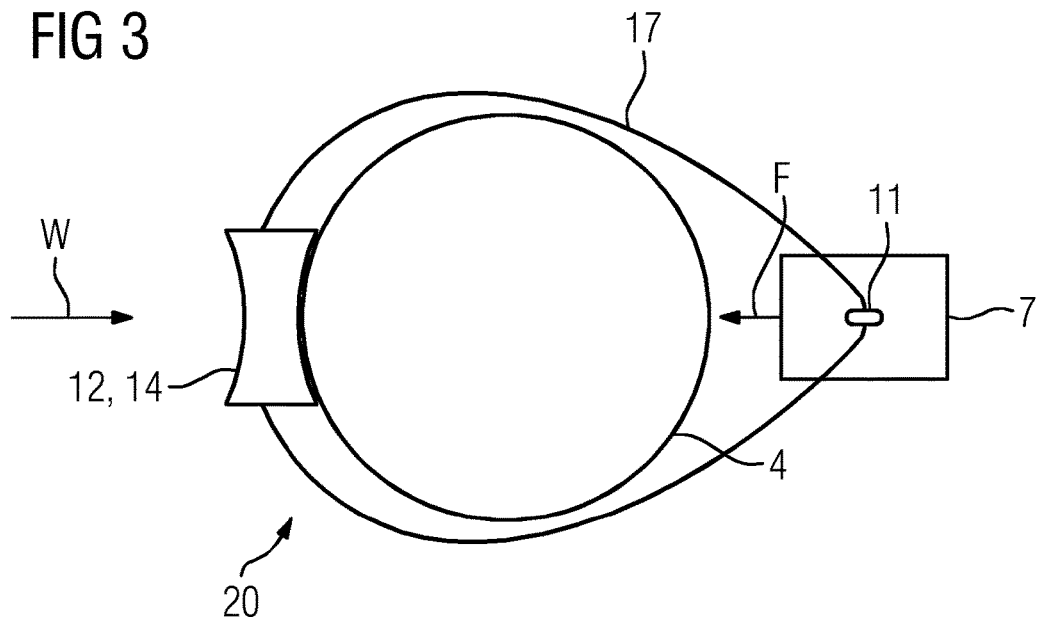
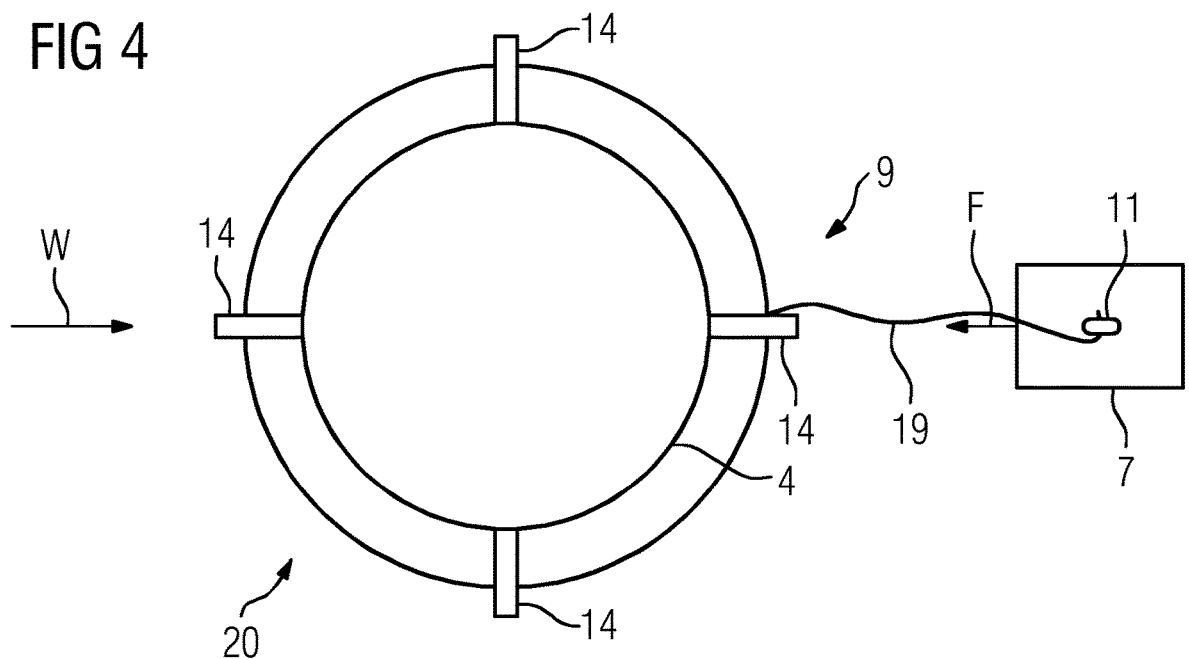

METHOD AND APPARATUS FOR RAISING OR LOWERING A LOAD PARALLEL TO A WIND TURBINE TOWER

CROSS-REFERENCE TO RELATED APPLICATIONS

This application claims priority to PCT Application No. PCT/EP2017/078826, having a filing date of Nov. 10, 2017, which is based on German Application No. 10 2017 202 064.4, having a filing date of Feb. 9, 2017, the entire contents both of which are hereby incorporated by reference.

FIELD OF TECHNOLOGY

The following relates to a method and an apparatus for raising or lowering a load parallel to a wind turbine tower.

BACKGROUND

Objects such as spare parts need to be mounted to wind turbines, in particular inside of nacelles of wind turbines.

EP 2 520 533 B1 discloses a service crane placed in the nacelle of the wind turbine. The service crane is designed as an extendable boom capable of reaching through a hatch of the nacelle to lift a load form a position adjacent to a base of the tower to the nacelle. However, there is a risk of damaging the load and/or the tower through possible collisions between the load and the tower. One way of avoiding such damages is addressed by EP 2 520 792 B1 suggesting placing spacers between the load and the tower during hoisting.

SUMMARY

An aspect relates to an improved method and apparatus for raising or lowering a load parallel to a wind turbine tower. In particular, it is desired to provide a method and apparatus which will allow assisting the raising or lowering procedure and reduce the movements of the load during raising or lowering.

Accordingly, a method for raising or lowering a load parallel to a wind turbine tower is provided. The method comprises raising or lowering the load using a cable, and exerting a force acting on the load towards the tower using guiding means supported at the tower.

Raising the load here means that the load is hoisted, or lifted. For example, the load might be raised from a position adjacent to a base of the tower to a nacelle located on top of the tower. Lowering the load designates the opposite movement, namely that of releasing, descending, or letting down the load. The respective operations of raising and lowering the load only differ in that they are opposite in direction. In the following description, only a raising operation will be described. It goes without saying that the lowering operation may be identically performed.

The load is raised parallel or at least substantially parallel to a surface of the tower. In general, the direction along which the load is raised corresponds to a vertical direction.

The load can be any object that needs to be placed atop or descended from the wind turbine, such as spare parts or service equipment. Often, these objects are too large and/or too heavy to be raised through the interior of the wind turbine tower, and are hence raised exterior of the wind turbine.

The cable used to raise the load is usually a steel cable. The cable provides a vertical force on the load for raising or lowering the load. "Vertical" herein includes deviations from exactly vertical of up to 30°, more preferred up to 15°. A lower end of the cable might be provided with a hook or carabiner to easily attach the load to the cable.

The guiding means are provided in addition to the cable, i.e. the guiding means and the cable are different elements. The guiding means are supported by the tower by directly contacting a surface thereof, or by contacting a surface of the tower indirectly, for example by placing an element such as a spacer between the guiding means and the tower. To apply a force to the load, the guiding means might be directly attached to the load. Alternatively, the guiding means can be attached to the hook or carabiner at the bottom end of the cable, or to a portion of the cable that is adjacent to the load.

The force exerted by the guiding means on the load prevents the load from moving away from the tower by more than a maximum distance dictated by the guiding means, in general by its length. Said force or length might be adjusted to account for factors such as the size and weight of the load, the height of the tower or weather conditions. As will be explained in more detail below, said force is in particular adjusted by adjusting a configuration of the guiding means.

The force exerted by the guiding means on the loads reduces movements, in particular swinging movements of the load during raise of the load. This is especially advantageous at high wind conditions that are often observed at offshore wind turbines. Thereby, damaging of the load and/or of the tower is prevented.

According to an embodiment, the guiding means are moveably supported at the tower and move along the tower when raising or lowering the load.

The guiding means may move in a direction that is parallel to the tower, in particular to an outer surface of the tower wall. In this case, the guiding means is raised or lowered together with the raising or lowering load. For example, a track might be fixed on the surface of the tower for guiding the guiding means.

According to a further embodiment, the load is arranged facing downwind from the tower.

In this embodiment, the force of the wind on the load pushes the load away from the tower. In other words, the force of the wind is parallel and opposite in direction to the force exerted on the load by the guiding means. The force exerted on the load by the guiding means might be chosen such as to closely or entirely balance out the force exerted on the load by the wind, by appropriately adjusting the configuration of the guiding means. Then, the load can be raised or lowered in parallel to the tower, without any swinging towards or away from the tower, thereby preventing damaging of the load and/or tower due to collisions.

According to a further embodiment, the guiding means comprise a closed loop around the tower.

To form a closed loop around the tower, the guiding means can be laid around the tower and directly or indirectly attached to the load. That way, the guiding means are reliably supported by the tower, and the attachment of the guiding means to the tower is not invasive for the tower since it is not necessary to provide the surface of the tower with a track, holes or the like for movably supporting the guiding means.

According to a further embodiment, a spacer is arranged between the guiding means and the tower.

One or more spacers may be attached to a surface of the tower and/or to the guiding means for providing clearance between the tower and the guiding means. A direct contact between the guiding means and the tower can thereby be avoided. The spacer can for example be wrapped around the guiding means. If the spacer is made of a material that does not damage the tower, such as a rubber material, foam or the like, damaging of the tower by the guiding means is avoided when using the spacer.

According to a further embodiment, the guiding means are supported by a rolling element that rolls along the tower when raising or lowering the load, the rolling element preferably forming the spacer.

A wheel, a roller or a pulley can be used as this rolling element. In general, the guiding means are directly attached or threaded through the rolling element. Generally, the rolling element is chosen such as to smoothly roll along the surface of the tower, thereby facilitating the raising of the guiding wire together with the load. If several rolling elements are used, the movement of the guiding wire along the surface of the tower is further facilitated. There should be a significant friction between the rolling element and the tower such that the guiding means are effectively supported at the tower and can efficiently exert the force on the tower.

The rolling element can be designed with a curvature that essentially matches the curvature of the tower wall (curvature around the vertical tower axis) for enhancing the contact area between the rolling element and the tower surface, thereby providing the necessary friction while still allowing for a smooth movement along the surface of the tower. Additionally, the rolling element can be constituted of a flexible material in such a way that the rolling element adapts to the changing curvature of the tower when the rolling element rolls along the tower surface, thereby optimizing the contact area between the rolling element and the tower surface. Moreover, the rolling element can act like as a spacer, and then brings about the advantages of the spacer described above.

According to a further embodiment, a weight is attached to the guiding means for increasing a gravitational force acting on the guiding means.

In addition to its own mass, the guiding means are provided with an additional weight having a defined mass. The gravitational force pulling the guiding means downwards can be adjusted by an accurate choice of the weight to account for factors such as the mass of the load and the strength of the wind. Swinging of the load can be further decreased by using the weight.

According to a further embodiment, a tack-line is attached to the guiding means.

One or several tack-line are connected to the guiding means for additional control of the load. For example, the tack-line can be a rope used to pull, e.g. by human force, the guiding means downwards, which has a similar effect as the weights described above.

According to a further embodiment, the guiding means comprise a guiding wire.

The guiding means are generally made of a material or covered/protected by a material that will not cause any damage to the surface of the tower, such as a steel wire enclosed in a rubber or plastic material or sheath. Usually, the wire provides some friction so as to not move around the tower and thus prevent, or at least reduce, the load from swinging during raising. Moreover, a guiding wire has the advantage of being cheap and universally available. "Wire" means any wire, rope or cable, and is preferably made of steel or nylon.

According to a further embodiment, the guiding means comprise a solid guiding ring surrounding the tower in full circumference.

The solid guiding ring might be a steel ring enclosed in a rubber or plastic material or sheath for avoiding damaging the tower. Generally, the guiding ring has a diameter to match the widest diameter of the tower. The steel ring is usually connected to the load by means of a wire.

The solid guiding ring can further be attached to a spring element connected to a rolling element that rolls along the tower when raising or lowering the load, wherein the spring element exerts a force on the rolling element so as to maintain a contact between the rolling element and the tower when raising or lowering the load. The spring element, for example a coil or leaf spring, connects the solid guiding ring and the rolling element. In this embodiment, the coil or leaf spring will be more or less compressed depending on the diameter of the tower, thereby maintaining the rolling device in close contact with the tower surface.

According to a further embodiment, a crane raises or lowers the load using the cable.

The crane supporting the cable might be an internal crane located inside the nacelle, or an external crane, standing on the ground near the base of the wind turbine, capable of reaching up to the nacelle or above the nacelle. As an alternative to the crane, a winch system placed inside the nacelle, or on the ground at the base of the tower might also be used.

According to a further embodiment, an apparatus for raising or lowering a load parallel to a wind turbine tower, comprises a cable for raising or lowering the load, and guiding means supported at the tower for exerting a force acting on the load towards the tower.

The apparatus might be provided with the elements described above and below in association with the method for raising or lowering the load, and vice versa.

Further possible implementations or alternative solutions of the embodiments of the invention also encompass combinations—that are not explicitly mentioned herein—of features described above or below with regard to the embodiments. The person skilled in the art may also add individual or isolated aspects and features to the most basic form of the embodiments of the invention.

BRIEF DESCRIPTION

Some of the embodiments will be described in detail, with reference to the following figures, wherein like designations denote like members, wherein:

FIG. 3 is a side view of the apparatus according to the first embodiment;

FIG. 4 is a view from above of the apparatus according to a second embodiment;

DETAILED DESCRIPTION

Figure 1:
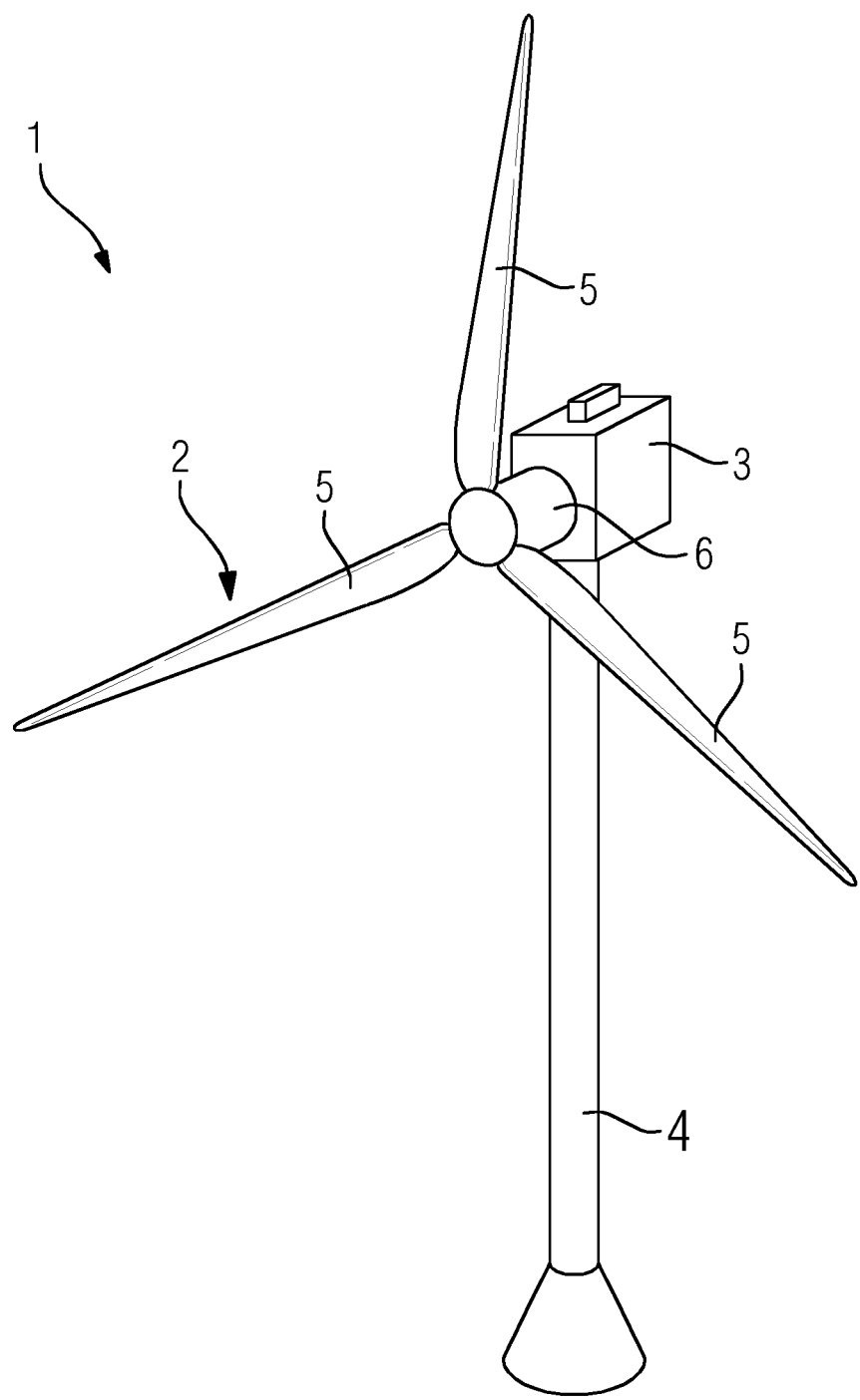
FIG. 1 is a perspective view of a wind turbine according to one embodiment.

In the figures, like reference numerals designate like or functionally equivalent elements, unless otherwise indicated.

FIG. 1 shows a wind turbine 1 according to an embodiment.

The wind turbine 1 comprises a rotor 2 connected to a generator (not shown) arranged inside a nacelle 3. The nacelle 3 is arranged at the upper end of a tower 4 of the wind turbine 1.

The rotor 2 comprises three rotor blades 5. The rotor blades 5 are connected to a hub 6 of the wind turbine 1. Rotors 2 of this kind may have diameters ranging from, for example, 30 to 160 meters or even more. The rotor blades 5 are subjected to high wind loads. At the same time, the rotor blades 5 need to be lightweight. For these reasons, rotor blades 5 in modern wind turbines 1 are manufactured from fiber-reinforced composite materials.

Figure 2:
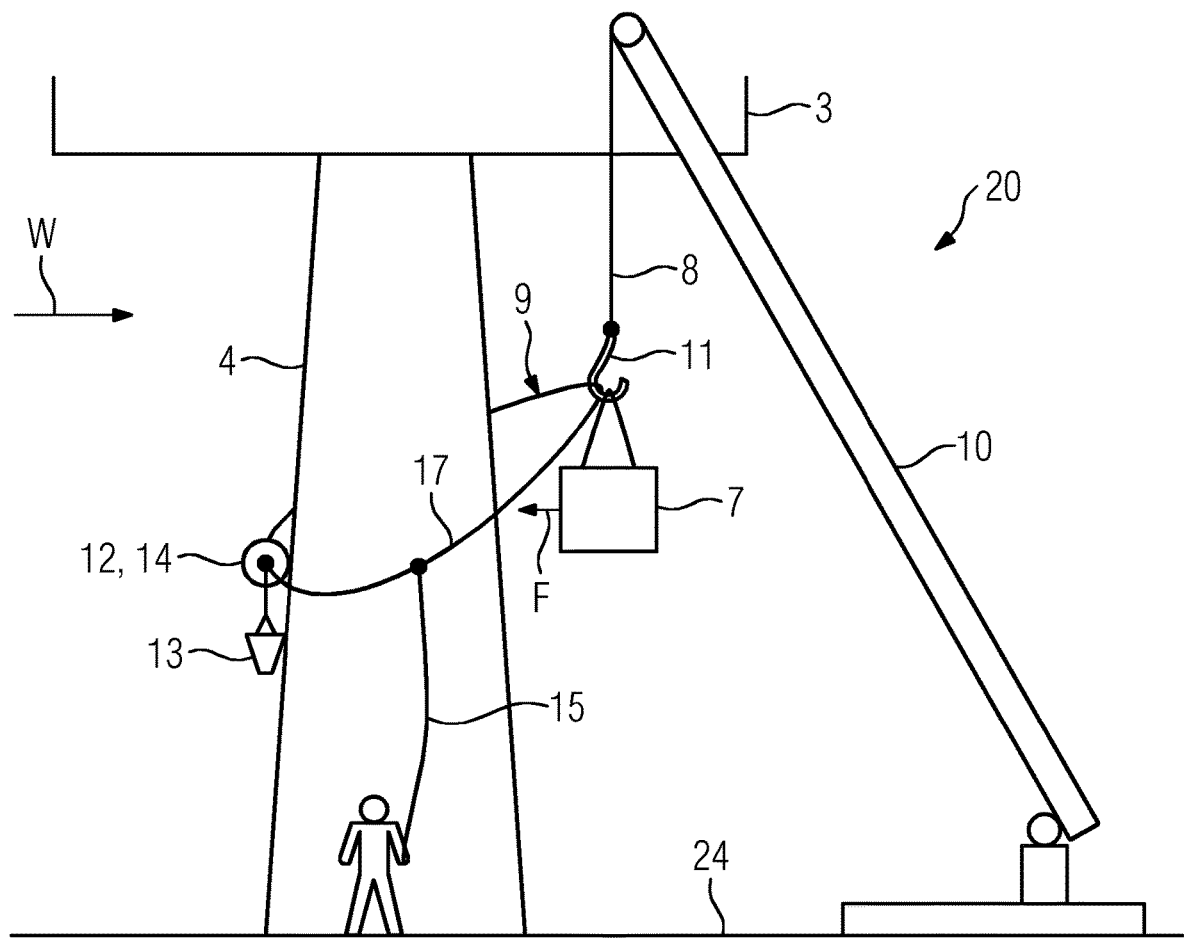
FIG. 2 is a side view of an apparatus according to a first embodiment.

FIG. 2 is a side view of an apparatus according to a first embodiment.

The apparatus 20 according to the first embodiment comprises an external crane 10 placed on a surface 24 near a base of the tower 4 or attached to the base and/or foundation of the tower 4. The crane 10 is used to raise a load 7 to the nacelle 3 by means of a cable 8. The cable 8 is attached to the load 7 by means of a hook 11. In FIG. 2, a direction of a wind force is indicated by an arrow W. The load 7 is placed downwind from the tower 4. Namely, the wind strikes the tower 4 from the left and the load 7 is placed on the right of the tower 4. A swinging of the load 7 due to the wind is prevented by the use of guiding means 9.

The guiding means 9 are, for example, constituted of a guiding wire 17, forming a loop around the tower 4. Both ends of the guiding wire 17 are attached to the hook 11. A roller 12 is attached to the guiding wire 17. To this end, the guiding wire 17 may pass through a hole in the center of the roller 12. The roller 12 acts as a spacer avoiding contact between the guiding wire 17 and the tower 4. When the crane 10 raises the load 7, the guiding wire 17 is raised together with the load 7 and moves along the surface of the tower 4 in a smooth manner, wherein the roller 12 rolls on the outer surface of the tower wall. Moreover, a weight 13 is attached to the guiding wire 17 close to the roller 12 such as to pull the guiding wire 17 downwards. Additionally, a tack-line 15 is attached to the guiding wire 17 for guiding the guiding wire 17. For example, a person (not shown) located on the surface 24 might hold, the extremity of the tack-line 15 that is not attached to the guiding wire 17, and pull or release said extremity to guide the guiding wire 17.

When the load 7 is raised or lowered, the wind puts the guiding wire 17 under tension such that the guiding wire 17 exerts a force F acting on the load 7 towards the tower 4.

FIG. 3 shows the apparatus according to the first embodiment as viewed from above. In particular, FIG. 3 shows that the roller 12 has an elongated, nearly cylindrical shape, with a concave curvature that essentially matches the curvature of the tower wall about the tower's vertical axis. A contact surface between the roller 12 and the tower 4 is thereby large.

Figure 5:
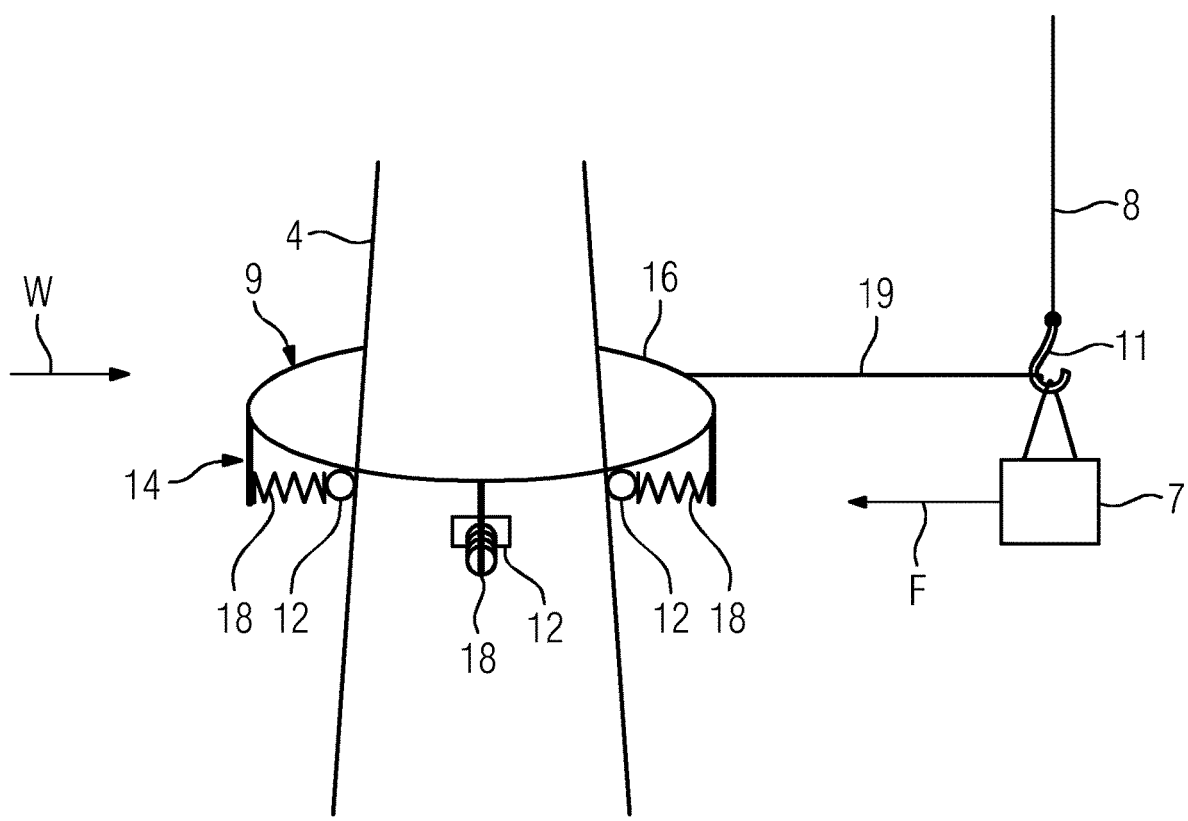
FIG. 5 is a side view of the apparatus according to the second embodiment.

FIGS. 4 and 5 are views of the apparatus according to a second embodiment. The second embodiment of the apparatus differs from that of the first embodiment in that instead of a guiding wire 17, the guiding means 9 comprise a solid guiding ring 16 surrounding the tower 4 in full circumference, and a connection wire 19 for connecting the solid guiding ring 16 to the hook 11. The solid guiding ring 16 is provided with four spacer 14, which are evenly distributed along the circumference of the solid guiding ring 16. In detail, as shown in FIG. 5, each spacer 14 comprises a roller 12, which is in contact with the surface of the tower 4, and a coil spring 18 connecting the roller 12 and the solid guiding ring 16. When the load 7 is raised, the guiding means 9 are displaced along the tower 4, with the rollers 12 constantly contacting the surface of the tower 4 due to compression of the coil springs 18.

When the load 7 is raised or lowered, the wind puts the connection wire 19 under tension such that the guiding means 9 exert the force F acting on the load 7 towards the tower 4.

Figure 6:
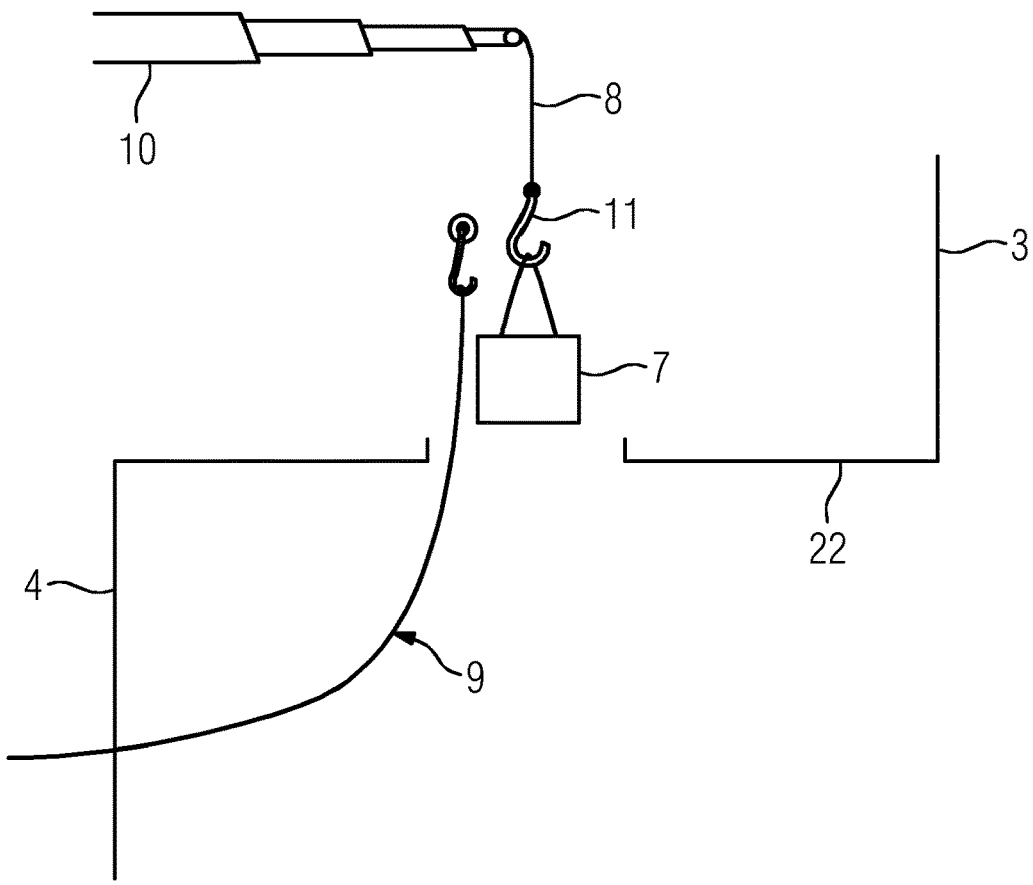
FIG. 6 is a side view illustrating a step of detaching the guiding means when the load arrives in the nacelle.

FIG. 6 shows a step of disconnecting the guiding means 9 when the load arrives in the nacelle 3. The raised load 7 enters the nacelle 3 through a hatch in a floor 22 of the nacelle 3. When the raised load 7 reaches the interior of the nacelle 3, it is protected from the wind, and the guiding means 9 can be detached from the hook 11 by means of a chainhoist 23, and placed in a park position, e.g. attached inside the nacelle 3, while the load 7 is raised further or also removed. When lowering the load 7, the guiding means 9 can easily be attached to the hook 11 again.

Figure 7:
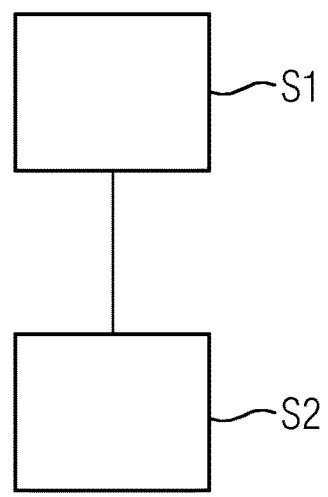
FIG. 7 shows an embodiment of a method for raising and lowering a load.

FIG. 7 shows an embodiment of a method for raising and lowering a load including steps S1 and S2. In step S1, the load 7 is raised or lowered using a cable 8. In step S2, a force F acting on the load 7 towards the tower 4 is exerted using guiding means 9 supported at the tower 4. The steps S1 and S2 can be executed simultaneously. Alternatively, step S1 can begin before step S2 begins, or step S2 can begin before step S1 begins. The method illustrated in FIG. 7 can be implemented using the apparatus 20 illustrated in FIG. 2.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for raising or lowering a load parallel to a wind turbine tower, comprising:
   raising or lowering the load using a cable; and
   exerting a force acting on the load towards the wind turbine tower using a closed loop positioned around the wind turbine tower such that the closed loop physically engages the wind turbine tower;
   wherein the closed loop is moveably supported at the wind turbine tower by a roller that rolls along an exterior surface of the wind turbine tower when raising or lowering the load;
   wherein a weight is attached to the closed loop proximate the roller for increasing a gravitational force acting on the closed loop.

2. The method according to claim 1, wherein the load is arranged facing downwind from the wind turbine tower.

3. The method according to claim 1, wherein a tack-line is attached to the closed loop.

4. The method according to claim 1, wherein the closed loop comprises a guiding wire.

5. The method according to claim 1, wherein the closed loop comprises a solid guiding ring surrounding the wind turbine tower in full circumference.

6. The method according to claim 5, wherein the closed loop is attached to a spring element connected to a roller that rolls along the wind turbine tower when raising or lowering the load, wherein the spring element exerts a force on the roller so as to maintain a contact between the roller and the wind turbine tower when raising or lowering the load.

7. The method according to claim 1, wherein a crane raises or lowers the load using the cable.

8. An apparatus for raising or lowering a load parallel to a wind turbine tower, comprising: a cable for raising or lowering the load; and a closed loop around the wind turbine tower for exerting a force acting on the load towards the wind turbine tower, the closed loop physically engaging the wind turbine tower, a roller supporting the closed loop, the roller rolls along an exterior surface of the wind turbine tower when raising or lowering the load; and a weight attached to the closed loop proximate the roller for increasing a gravitational force acting on the closed loop.

9. A method for raising or lowering a load parallel to a wind turbine tower, comprising:
- raising or lowering the load using a cable;
- exerting a force acting on the load towards the wind turbine tower using a closed loop positioned around the wind turbine tower such that the closed loop physically engages the wind turbine tower;
- arranging a roller between the closed loop and the wind turbine tower, wherein the closed loop is supported by the roller that rolls along an exterior surface of the wind turbine tower when raising or lowering the load; and
- attaching a weight to the closed loop proximate the roller for increasing a gravitational force acting on the closed loop.

* * * * *